United States Patent
Peterson et al.

(10) Patent No.: US 11,429,263 B1
(45) Date of Patent: Aug. 30, 2022

(54) WINDOW PLACEMENT BASED ON USER LOCATION

(71) Applicant: LENOVO (Singapore) PTE. LTD., New Tech Park (SG)

(72) Inventors: Nathan J. Peterson, Oxford, NC (US); Russell Speight VanBlon, Raleigh, NC (US); John Carl Mese, Cary, NC (US); Arnold S. Weksler, Raleigh, NC (US); Mark Patrick Delaney, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 8 days.

(21) Appl. No.: 16/546,011

(22) Filed: Aug. 20, 2019

(51) Int. Cl.
*G06F 3/04845* (2022.01)
*G06F 3/01* (2006.01)

(52) U.S. Cl.
CPC .......... *G06F 3/04845* (2013.01); *G06F 3/011* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 6,654,036 B1* | 11/2003 | Jones | ..................... | G06F 3/0481 715/788 |
| 2009/0150823 A1* | 6/2009 | Orr | ........................ | G06F 3/0481 715/788 |
| 2011/0298722 A1* | 12/2011 | Tse | .......................... | G06F 3/041 345/173 |
| 2012/0179994 A1* | 7/2012 | Knowlton | ........... | G06F 3/04897 715/779 |
| 2013/0215005 A1* | 8/2013 | Senanayake | ......... | G06F 3/0362 345/156 |
| 2014/0055400 A1* | 2/2014 | Reuschel | ................ | G06F 3/011 345/173 |
| 2014/0223335 A1* | 8/2014 | Pearson | ................ | G06F 3/0481 715/753 |
| 2014/0344750 A1* | 11/2014 | Takahashi | ........... | G06F 3/04886 715/790 |
| 2014/0351722 A1* | 11/2014 | Frederickson | ........ | G06F 3/0481 715/761 |
| 2014/0372939 A1* | 12/2014 | Parker | ................... | G06F 3/0481 715/799 |
| 2019/0197785 A1* | 6/2019 | Tate-Gans | ............ | G06T 19/006 |
| 2019/0251884 A1* | 8/2019 | Burns | ................... | G09G 1/007 |

* cited by examiner

*Primary Examiner* — Adam M Queler
*Assistant Examiner* — Haimei Jiang
(74) *Attorney, Agent, or Firm* — Kunzler Bean & Adamson

(57) ABSTRACT

For window placement based on user location, a processor determines a user location. The processor further determines active use of a window on the display. In response to determining active use of the window, the processor moves the window to a user position proximate to the user location.

14 Claims, 7 Drawing Sheets

WINDOW PLACEMENT BASED ON USER LOCATION

FIELD

The subject matter disclosed herein relates to window placement and more particularly relates to window placement based on user location.

BACKGROUND

A user may not be in front of all portions of a large display.

BRIEF SUMMARY

An apparatus for window placement based on user location is disclosed. The apparatus includes a display, a processor, and a memory that stores code executable by the processor. The processor determines a user location. The processor further determines active use of a window on the display. In response to determining active use of the window, the processor moves the window to a user position proximate to the user location. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
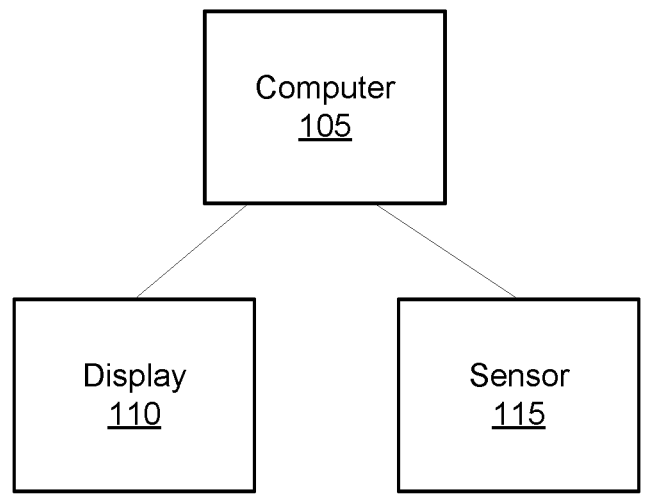
FIG. 1 is a schematic block diagram illustrating one embodiment of a window placement system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a window placement system 100. The window placement system 100 may determine a user location, determine active use of a window on a display 110, and in response to determining active use of the window, move the window to a user position proximate to the user location. In the depicted embodiment, the system 100 includes a computer 105, the display 110, and a sensor 115. The display 110 may display images and data as directed by the computer 105. The display 110 may comprise a plurality of discrete monitors. In addition, the display 110 may be a single monitor. In one embodiment, the display 110 is divided into sectors. In a certain embodiment, each sector is a monitor. The sensor 115 may sense a user location of a user that is viewing the images and data on the display 110.

In the past, user locations were typically close to all portions of the display 110. However, as displays 110 have become larger and/or more displays 110 are being employed by a single user, a user location may only be proximate to only a portion of the display 110. The embodiments described herein determine the user location, determine active use of a window on the display 110, and move the window to the user position proximate to the user location as will be described hereafter. As a result, the window is automatically positioned where the window can be easily viewed by the user, improving the efficiency of the system 100.

Figure 2A:
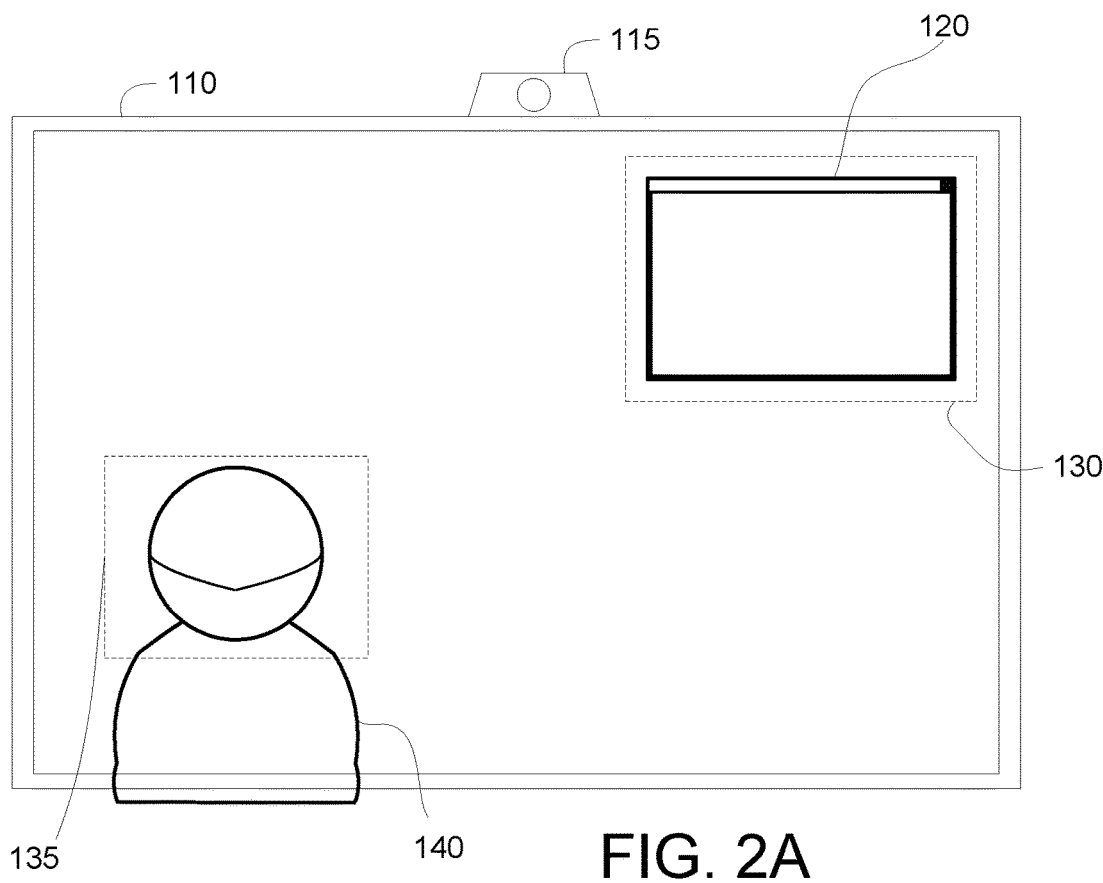
FIG. 2A is a schematic drawing illustrating one embodiment of a user and display.

FIG. 2A is a schematic drawing illustrating one embodiment of a user 140 and display 110. In the depicted embodiment, a user 140 is at a user location 135 in front of the display 110. The user location 135 may be a position of the user's head relative to the display 110. The user location 135 may be a projection of the user's head onto the display 110 along a vector normal to the surface of the display 110. In a certain embodiment, the user location 135 is the position of the user's eyes relative to the display 110. The user location 135 may be a projection of the user's eyes onto the display 110 along a vector normal to the surface of the display 110.

In one embodiment, the user location 135 may be a controller location of a game controller. The user location 135 may be a vertical column of the display 110 that is centered on a horizontal position of the game controller relative to the display 110. In addition, the user location 135 may be a location of a pointing device. The user location 135 may be a vertical column of the display 110 that is centered on a horizontal position of the pointing device relative to the display 110. The user location 135 may further be a location of the keyboard. The user location 135 may be a vertical column of the display 110 that is centered on a horizontal position of the keyboard relative to the display 110.

The user location 135 may be determined by the sensor 115. In the depicted embodiment, the sensor 115 is a camera. The camera may be an optical spectrum camera, a black-and-white camera, and/or an infrared camera. The sensor 115 may capture an image of the user, controller, pointing device, and/or keyboard. In certain embodiments, the sensor 115 may comprise an acoustic rangefinder.

The display 110 may present a window 120. The window 120 may be presented at a starting position 130. As shown, the starting position 130 of the window 120 may not be proximate to the user location 135.

In one embodiment, the window 120 is proximate to the user location 135 if the user location 135 encloses a center of the window 120. In addition, the window 120 is proximate to the user location 135 if the window 120 encloses a center of the user location 135. In one embodiment, the window 120 is proximate to the user location 135 if an overlap percentage of the window 135 overlaps the user location 135. The overlap percentage may be in the range of 50 to 90 percent.

Figure 2B:
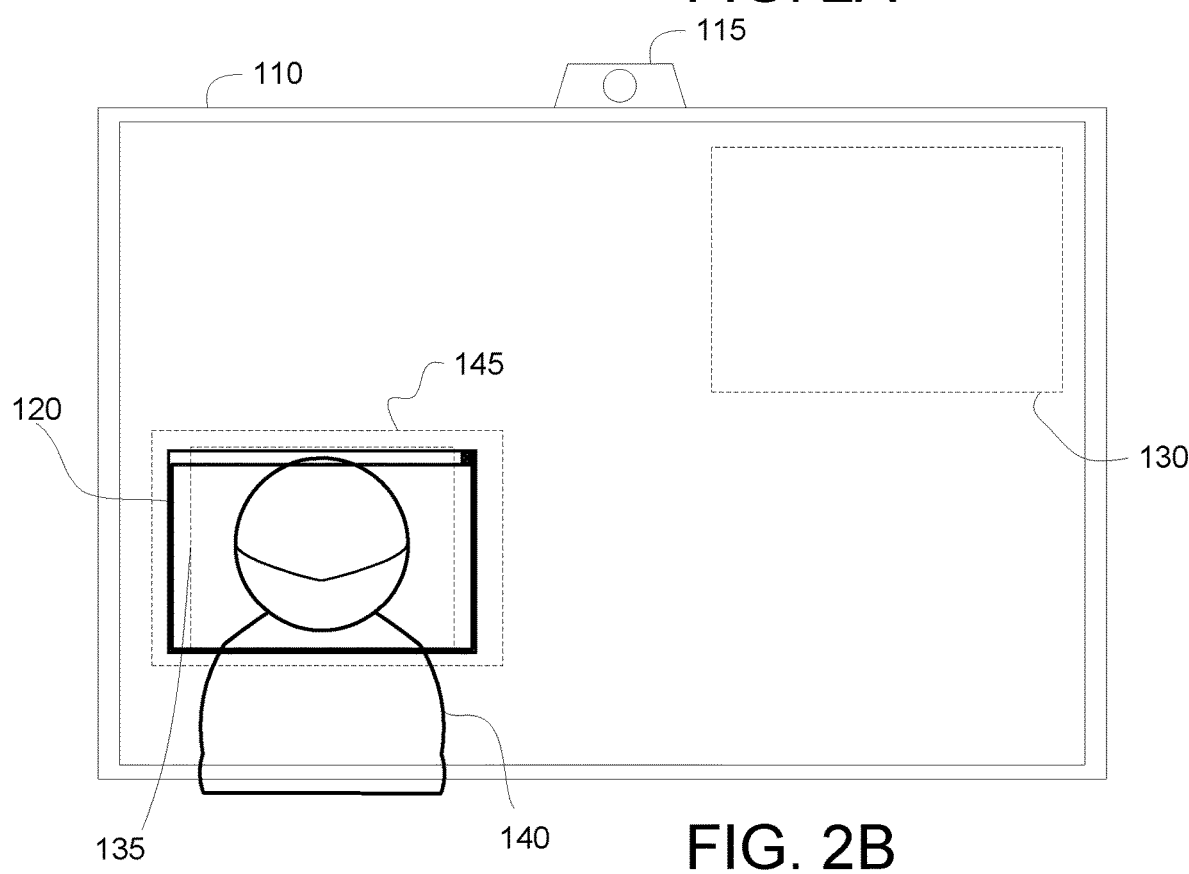
FIG. 2B is a schematic drawing illustrating one embodiment of moving a window.

FIG. 2B is a schematic drawing illustrating one embodiment of moving a window 120. In the depicted embodiment, the window 120 is moved to a user position 145 proximate to the user location 135. In one embodiment, the user position 145 is embodied within the user location 135. In the depicted embodiment, the user location 135 is embodied within the user position 145.

The user position 145 may be proximate to the user location 135 if the user location 135 encloses a center of the user position 145. In addition, the user position 145 may be proximate to the user location 135 if the user position 145 encloses a center of the user location 135. In one embodiment, the user position 145 may be proximate to the user location 135 if an overlap percentage of the window 135 overlaps the user location 135. The overlap percentage may be in the range of 50 to 90 percent.

Moving the window 120 to the user position 145 that is proximate to the user location 135 enables the user 142 more easily view the window. As a result, the user experience is enhanced. In addition, the efficiency of the system 100 is improved.

Figure 2C:
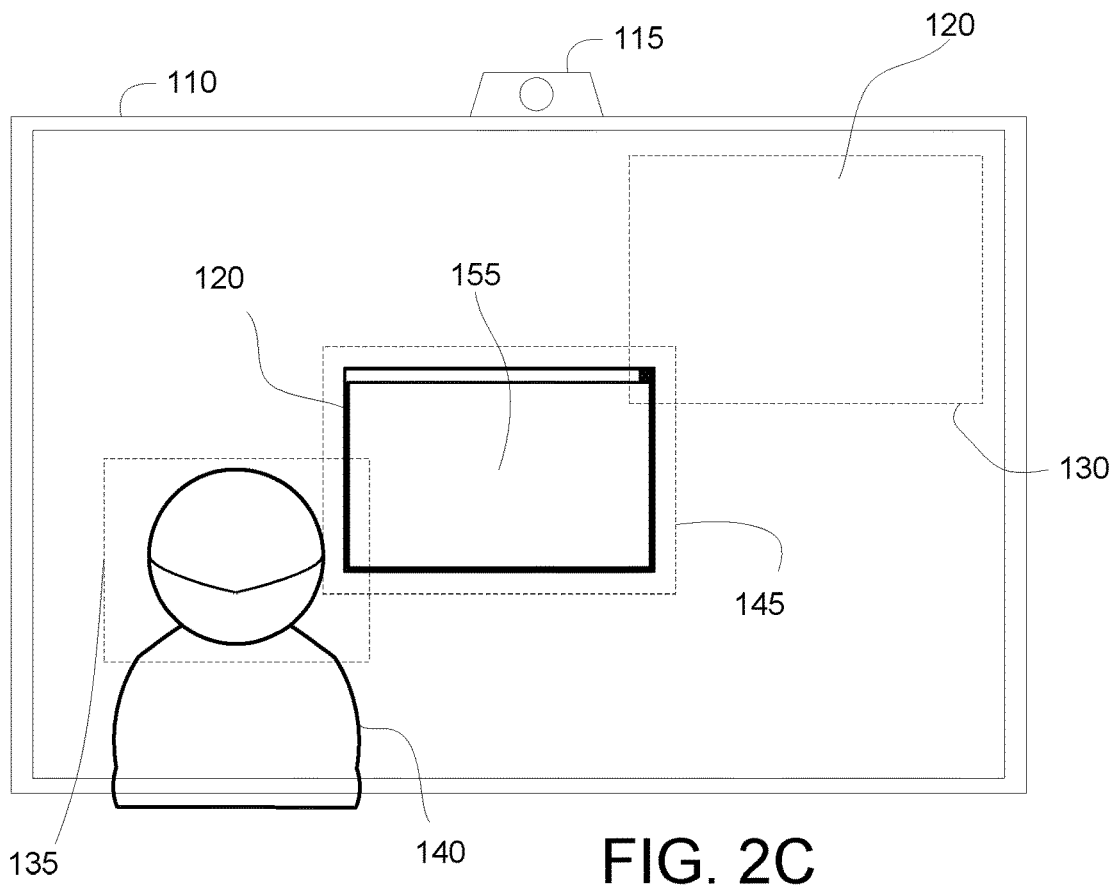
FIG. 2C is a schematic drawing illustrating one alternate embodiment of moving a window.

FIG. 2C is a schematic drawing illustrating one alternate embodiment of moving a window 120. In the depicted embodiment, the window 120 is moved to the user position 145 that is at a display center 155. As a result, the user experience is enhanced. In addition, the efficiency of the system 100 is improved.

Figure 2D:
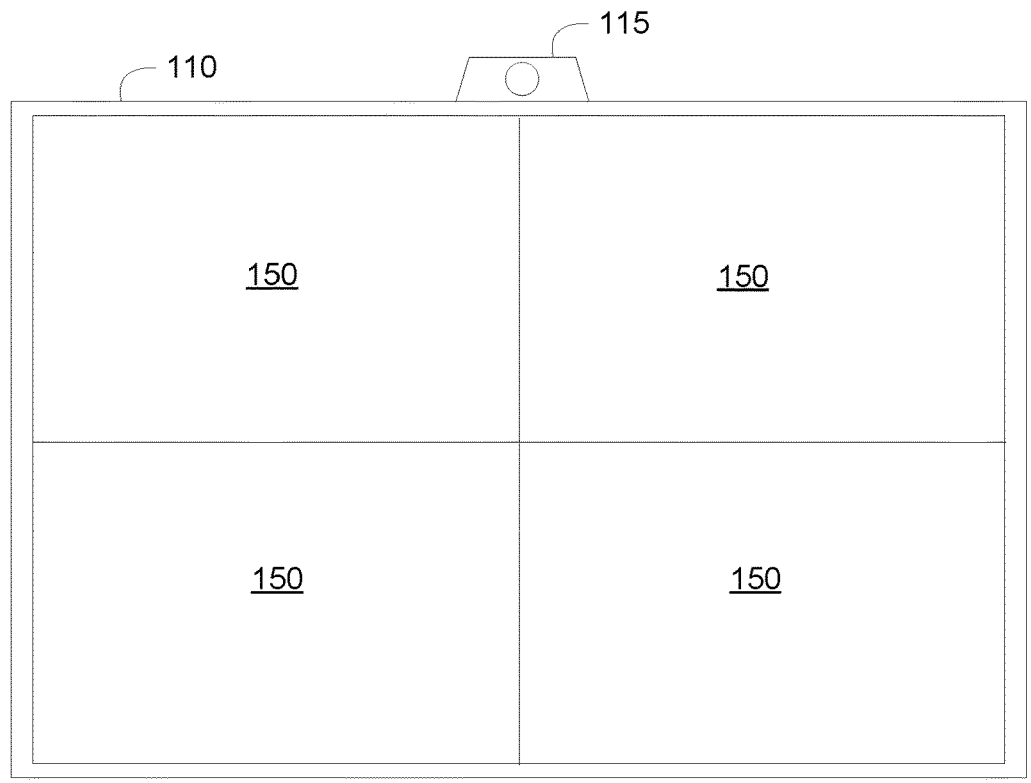
FIG. 2D is a schematic drawing illustrating one embodiment of display sectors.

FIG. 2D is a schematic drawing illustrating one embodiment of display sectors 150. In the depicted embodiment, the display 110 is divided into four sectors 150. The display 110 may be divided into any number and/or arrangement of sectors 150.

Figure 2E:
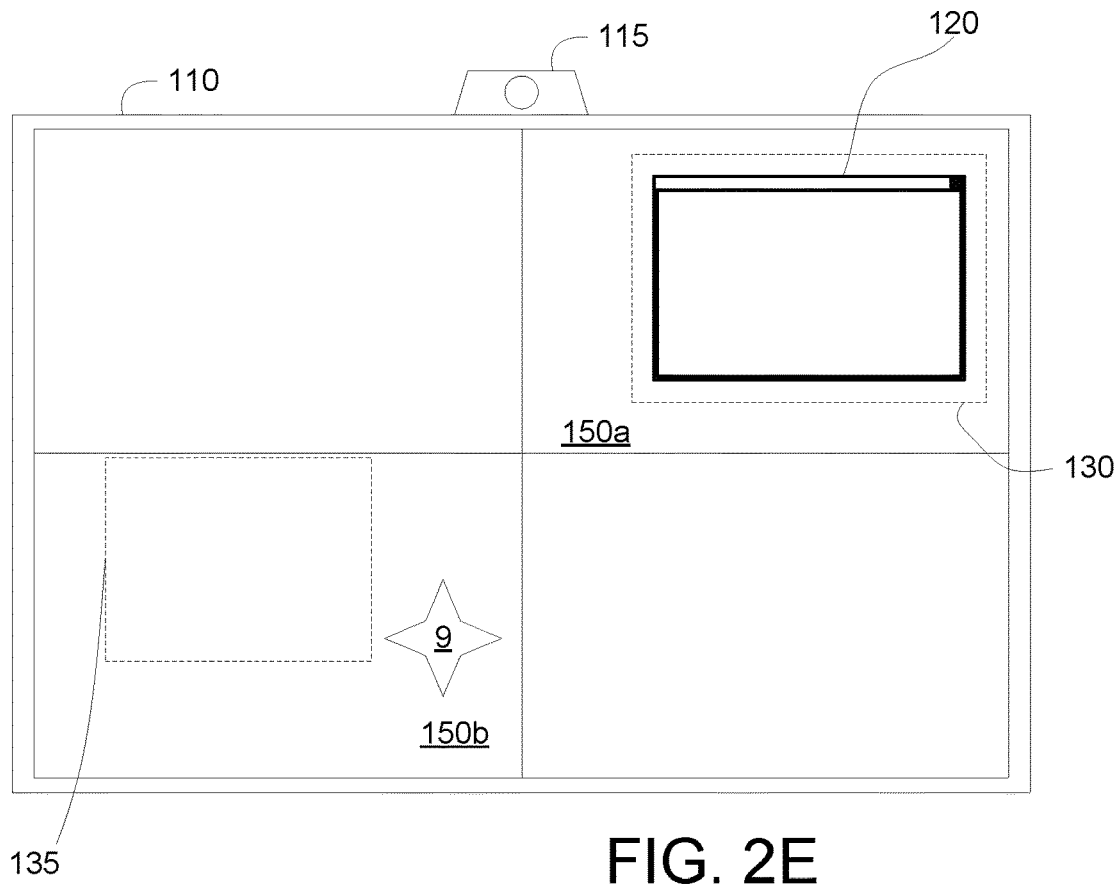
FIG. 2E is a schematic drawing illustrating one embodiment of displaying a window in sectors.

FIG. 2E is a schematic drawing illustrating one embodiment of displaying the window 120 in sectors 150. In the depicted embodiment, the window 120 is displayed at a starting position 130 in a first sector 150a. The user location 135 is in a second sector 150b. The second sector 150b includes an image 9.

Figure 2F:
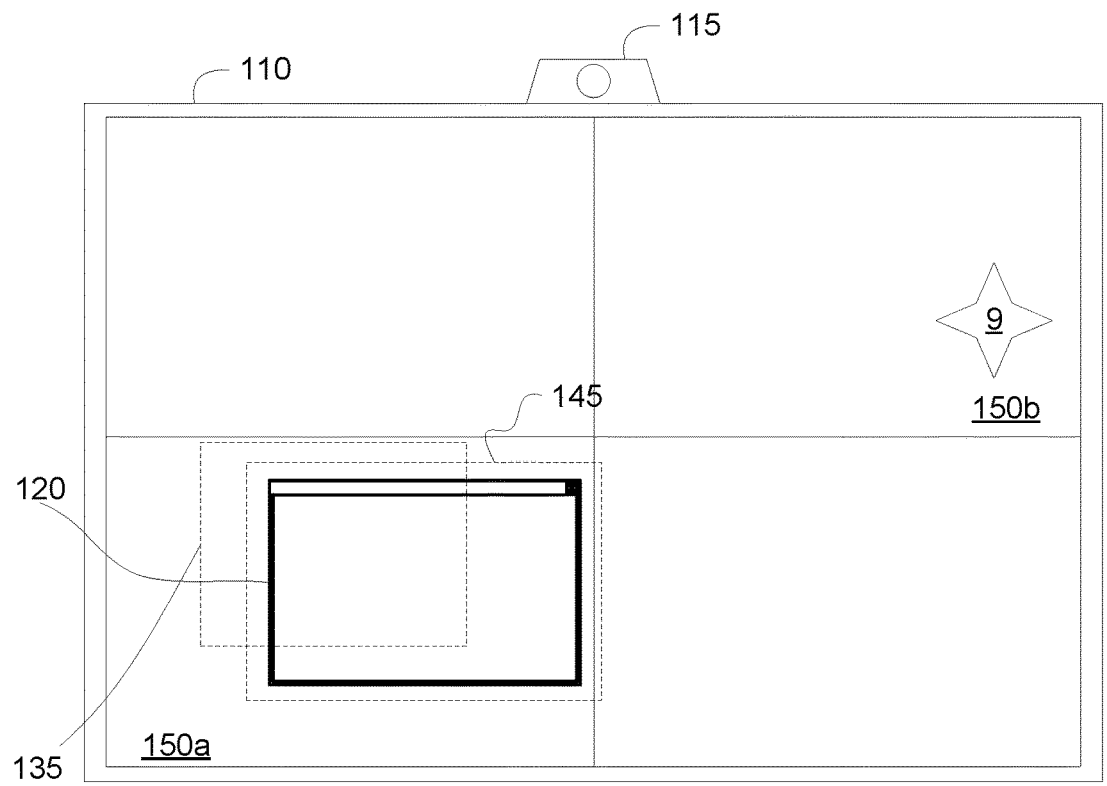
FIG. 2F is a schematic drawing illustrating one alternate embodiment of moving a window with sectors.

FIG. 2F is a schematic drawing illustrating one embodiment of moving a window 120 in sectors 150. The sectors 150 of FIG. 2E are shown. In the depicted embodiment, moving the window 120 comprises swapping the first sector 150a comprising the starting position 130 of the window 120 with the second sector 150b comprising the user location 135. As a result, the window 120 is at a user position 145 proximate to the user location 135. In the depicted embodiment, the position of the window 120 within the first sector 150a is unchanged. In addition, position of the image 9 with the second sector 150b is unchanged. In one embodiment, the user position 145 is within a first sector 150a that comprises the more than half of the user location 135.

Figure 3:
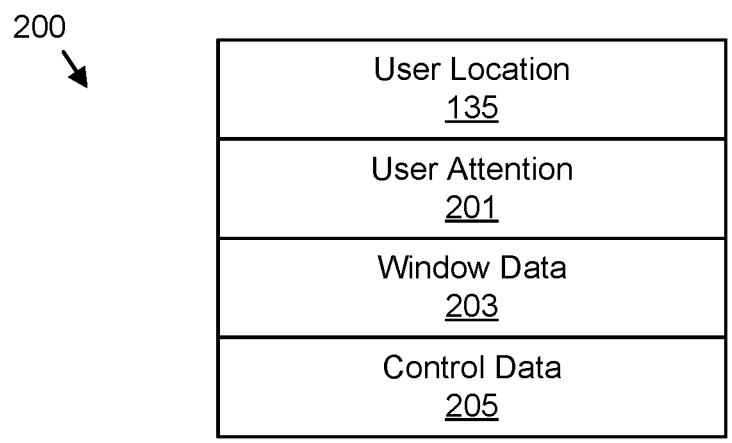
FIG. 3 is a schematic block diagram illustrating one embodiment of window data.

FIG. 3 is a schematic block diagram illustrating one embodiment of window data 200. The window data 200 may be organized as a data structure in a memory. In the depicted embodiment, the window data 200 includes the user location 135, a user attention 201, window data 203, and control data 205.

The user location 135 may store the location of the user, the user's face, and/or the user's eyes relative to the display 110. The user attention 201 may record where the user is looking on the display 110. In one embodiment, eye tracking with the sensor 115 may determine where the user is looking on the display 110.

The window data 203 may record the position of the window 120 on the display 110. In addition, the window data 203 may record if the window 120 is currently active or currently inactive. An active window 120 may receive commands and/or data that are input by the user 140. For example, the active window 120 may receive text that is input at a keyboard. In addition, an active window 120 may present information. In one embodiment, the active window 120 is presenting current information. Current information may include a message, an email, a video, and the like. Current information may be updated within an update time interval such as 0 to 30 seconds.

The control data 205 may record a position of a pointing device such as a mouse. In addition, the control data 205 may record a status of keyboard inputs.

Figure 4:
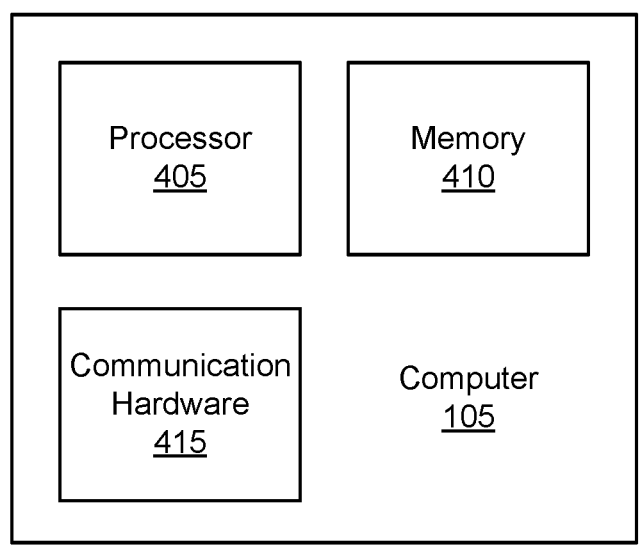
FIG. 4 is a schematic block diagram illustrating one embodiment of a computer.

FIG. 4 is a schematic block diagram illustrating one embodiment of the computer 105. In the depicted embodiment, the computer includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices such as the display 110 and/or the sensor 115.

Figure 5:
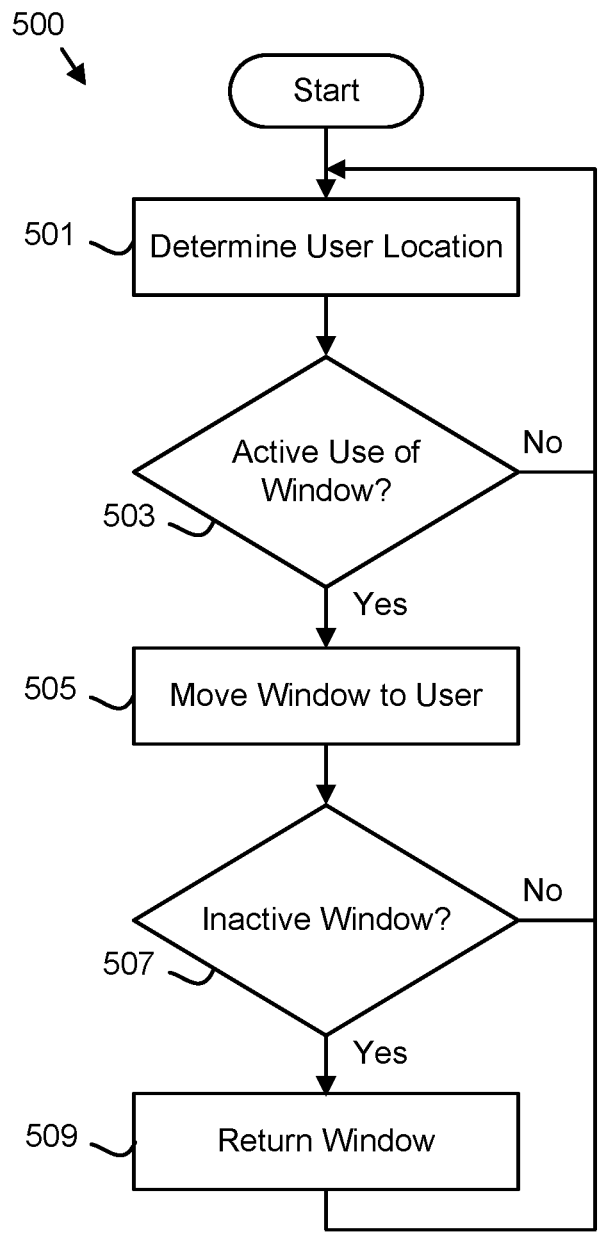
FIG. 5 is a schematic flow chart diagram illustrating one embodiment of a window placement method.

FIG. 5 is a schematic flow chart diagram illustrating one embodiment of a window placement method 500. The method 500 may move the window 120 to a user position 145 proximate to the user location 135 in response to determining active use of the window 120. The method 500 may be performed by the computer 105 and/or processor 405 of the computer 105.

The method 500 starts, and in one embodiment, the processor 405 determines 501 the user location 135. The user location 135 may be determined 501 by identifying the user 140 from an image captured by the sensor 115. In addition, the position of the user's face may be identified. In a certain embodiment, the position of the user's eyes may be identified. The user location 135 may be determined 501 at the position of the user 140, the user's face, and/or the user's eyes normal to the display 110.

The processor 405 may determine 503 active use of the window 120. Active use of the window 120 may be determined 503 from the user attention 201 and/or the control data 205. In one embodiment, active use is determined 503 if the window 120 is selected to receive control data 205. In addition, active use may be determined 503 if the user attention includes the window 120. In one embodiment, active use is determined 503 if the window 120 is presenting current information.

In a certain embodiment, active use is determined if Equation 1 is satisfied, wherein TH is a distance threshold, CA is a center of the user attention 201, and WB is a boundary of the window 120. The distance function may return zero if the center of the user attention CA 201 is within the boundary of the window 120. The distance function may further return a distance from the center of the user attention CA 201 to the boundary of the window 120 closest to the center of the user attention CA 201 if the center of the user attention CA 201 is not within the boundary of the window 120. The distance threshold TH may be in the range of 100 to 1000 pixels.

$$TH < distance(WB, CA) \quad \text{Equation 1}$$

In a certain embodiment, active use of the window 120 is determined 503 if both the window 120 is selected to receive the control data 205 and Equation 1 is satisfied.

If active use of the window 120 on the display 110 is not determined 503, the processor 405 may continue to determine 501 the user location 135. If active use of the window 120 on the display 110 is determined 503, the processor 405 moves 505 the window 120 to the user position 145 proximate to the user location 135.

The processor 405 may move 505 the window 120 to the user position 145 co-located with the user location 135 as shown in FIG. 2B. in addition, the processor 405 may move 505 the window 120 to the user location 145 at the display center 155 as shown in FIG. 2C. Moving 505 the window 120 may further comprise swapping a first sector 150a comprising a starting position 130 of the window 120 with a second sector 150b comprising the user location 135 as shown in FIG. 2F. In one embodiment, a plurality of windows 120 are moved to corresponding user positions for a plurality of user locations 135.

In one embodiment, the processor 405 determines 507 if the window 120 is inactive. The window 120 may be determined 507 to be inactive if the window 120 is not selected to receive control data 205. In one embodiment, the window 120 is determined 507 be inactive if another window 120 is determined 503 to be an active use. In a certain embodiment, the window 120 is determined 507 to be inactive if the window 120 has not received control data 205 and/or Equation 1 has not been satisfied for an inactivity time interval. The inactivity time interval may be in the range of 5 to 15 minutes. In addition, the window 120 may be inactive if window 120 hasn't received current information in an inactive time interval. The inactive time interval may be 5 to 15 minutes.

If the window 120 is not inactive, the processor 405 loops to determine 501 the user location 135. If the window 120 is inactive, the processor 405 returns 509 the window 120 to the starting position 130 of the window 120 on the display 110. For example, if the window 120 of FIG. 2B is determined to be inactive, the window 120 may be returned 509 to the starting position 130 of FIG. 2A. In addition, if the window 120 of FIG. 2F is determined to be inactive, the window 120 may be returned 509 by swapping the first sector 150a and the second sector 150b to the arrangement illustrated in FIG. 2E.

By moving an active window 120 to the user position 145 proximate to the user location 135, the embodiments improve the efficiency of the user interaction with the display 110. As a result, the efficiency of the computer 105 in the system 100 is also improved.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a display that is divided into four sectors, wherein each sector is in an original position within the display and comprises windows and images and each window and image is in a position within the sector;
  a processor;
  a memory that stores code executable by the processor to:
  determine a user position within a first sector that comprises a user location at a position of user's eyes relative to the display;
  in response to user attention including a first window in a second sector, determine active use of the first window on the display;
  in response to determining active use of the first window, move the first window to the user position proximate to the user location by swapping the first sector with the second sector within the display, wherein the first sector is presented in an original position within the display of the second sector, the second sector is presented in an original position of the first sector with the display, a size of the first sector and a size of the second sector remain unchanged throughout the swap of the first sector and the second sector and the size of the first sector is equal to the size of the second sector, and the positions of the windows and the images and positions of the images within the first sector are unchanged and the positions of the windows and the images within the second sector are unchanged;

determine the first window is inactive in response to the user attention including a second window in another sector; and in response to determining active use of the second window, swap the second sector and the another sector.

2. The apparatus of claim 1, wherein the code is further executable by the processor to:

determine inaction of the first window; and swap the first sector with the second sector, returning the first sector and the second sector to the original positions.

3. The apparatus of claim 1, wherein the display comprises a plurality of discrete monitors.

4. The apparatus of claim 1, wherein the user position is at a display center.

5. The apparatus of claim 1, wherein active use of the window is further determined from control data.

6. The apparatus of claim 1, wherein a plurality of windows are moved to corresponding user positions for a plurality of user locations.

7. A method comprising:

determining a user position within a first sector of a display that is divided into sectors, wherein the user position comprises a user location at a position of user's eyes relative to the display;

in response to user attention including a first window in a second sector, determining active use of a first window on the display;

in response to determining active use of the first window, moving the first window to the user position proximate to the user location by swapping the first sector with the second sector within the display, wherein the first sector is presented in an original position within the display of the second sector, the second sector is presented in an original position of the first sector with the display, a size of the first sector and a size of the second sector remain unchanged throughout the swap of the first sector and the second sector and the size of the first sector is equal to the size of the second sector, and the positions of the windows and the images and positions of the images within the first sector are unchanged and the positions of the windows and the images within the second sector are unchanged;

determining the first window is inactive in response to the user attention including a second window in another sector; and in response to determining active use of the second window, swapping the second sector and the another sector.

8. The method of claim 7, the method further comprising:

determining inaction of the first window; and swapping the first sector with the second sector, returning the first sector and the second sector to the original positions.

9. The method of claim 7, wherein the display comprises a plurality of discrete monitors.

10. The method of claim 7, wherein the user position is at a display center.

11. The method of claim 7, wherein active use of the window is further determined from control data.

12. The method of claim 7, wherein a plurality of windows are moved to corresponding user positions for a plurality of user locations.

13. A program product comprising a non-transitory computer readable storage medium that stores code executable by a processor, the executable code comprising code to:

determine a user position within a first sector of a display that is divided into sectors, wherein the user position comprises a user location at a position of user's eyes relative to the display;

in response to the user attention including a first window in a second sector, determining active use of a first window on the display;

in response to determining active use of the first window, move the first window to a user position proximate to the user location by swapping the first sector window with the second sector within the display, wherein the first sector is presented in an original position within the display of the second sector, the second sector is presented in an original position of the first sector with the display, a size of the first sector and a size of the second sector remain unchanged throughout the swap of the first sector and the second sector and the size of the first sector is equal to the size of the second sector, and the positions of the windows and the images and positions of the images within the first sector are unchanged and the positions of the windows and the images within the second sector are unchanged, determine the first window is inactive in response to the user attention including a second window in another sector; and in response to determining active use of the second window, swap the second sector and the another sector.

14. The program product of claim 13, wherein the code is further executable by the processor to:

determine inaction of the first window; and swap the first sector with the second sector, returning the first sector and the second sector to the original positions.

* * * * *